April 25, 1950

W. L. ATWOOD 2,504,956

COMBINED HEATING ELECTRODES AND VARIABLE
CAPACITOR FOR DIELECTRIC HEATING

Filed May 31, 1946

INVENTOR
WILFRID L. ATWOOD
BY
Woodcock and Phelan
ATTORNEYS

April 25, 1950
W. L. ATWOOD
2,504,956
COMBINED HEATING ELECTRODES AND VARIABLE
CAPACITOR FOR DIELECTRIC HEATING
Filed May 31, 1946
2 Sheets-Sheet 2
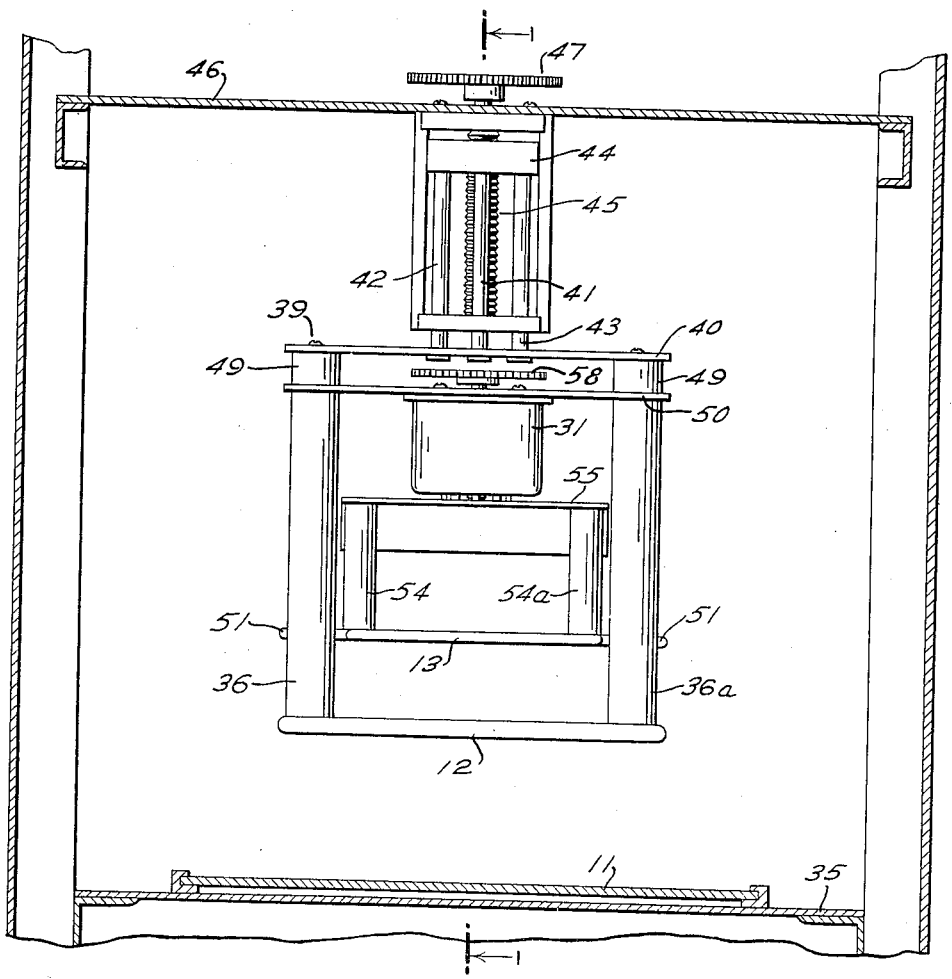
INVENTOR
WILFRID L. ATWOOD
BY
Woodcock and Phelan
ATTORNEYS Patented Apr. 25, 1950

2,504,956

UNITED STATES PATENT OFFICE 2,504,956

COMBINED HEATING ELECTRODES AND VARIABLE CAPACITOR FOR DIELECTRIC HEATING

Wilfrid L. Atwood, Newton Lower Falls, Mass., assignor to The Girdler Corporation, Louisville, Ky., a corporation of Delaware Application May 31, 1946, Serial No. 673,296

11 Claims. (Cl. 219—47)

This invention relates to high-frequency treating systems for dielectric materials and has for an object the provision of means not only of applying pressure to the load or to the dielectric material undergoing treatment but also for regulating the amount of electrical power or energy applied to or absorbed by said material.

It has heretofore been recognized that dielectric materials change their characteristics with increasing temperature. The power factor and dielectric constant of many materials increase as the temperature rises. In accordance with the disclosure of my co-pending application, Serial No. 597,048, filed June 1, 1945, for "High-frequency treating system," the relative positions of the heating electrodes are automatically varied to maintain the electrical energy delivered to the load or the material to be heated at a predetermined or constant value. A system of that character in general requires that there be maintained a space between at least one of the electrodes and the material undergoing treatment.

In carrying out the present invention in one form thereof, a system is provided which may function in the same manner as the system of my said co-pending application. Additionally, a pressure plate or electrode is provided for engagement with the work or the material to be heated and by means of which pressure may be exerted thereon during the heating operation. With this electrode directly in contact with the material to be heated, another electrode may be adjusted to vary the capacitance in the heating circuit to maintain the power input level substantially constant at a predetermined value notwithstanding changes in the dielectric constant and in the resistance of the load comprising the material undergoing treatment. In accordance with the invention, the usefulness of my prior system is extended and the new system may be used for a variety of heating problems, either with or without the application of pressure to the material to be heated.

For a more detailed presentation of the invention and for further objects and advantages thereof, reference should be had to the following description taken in conjunction with the accompanying drawings, in which:

Fig. 2 is a sectional view taken on the line 2—2 of Fig. 1 with parts omitted; and Fig. 3 is a wiring diagram, diagrammatically illustrating the principal components of a system embodying the invention.

Figure 1:
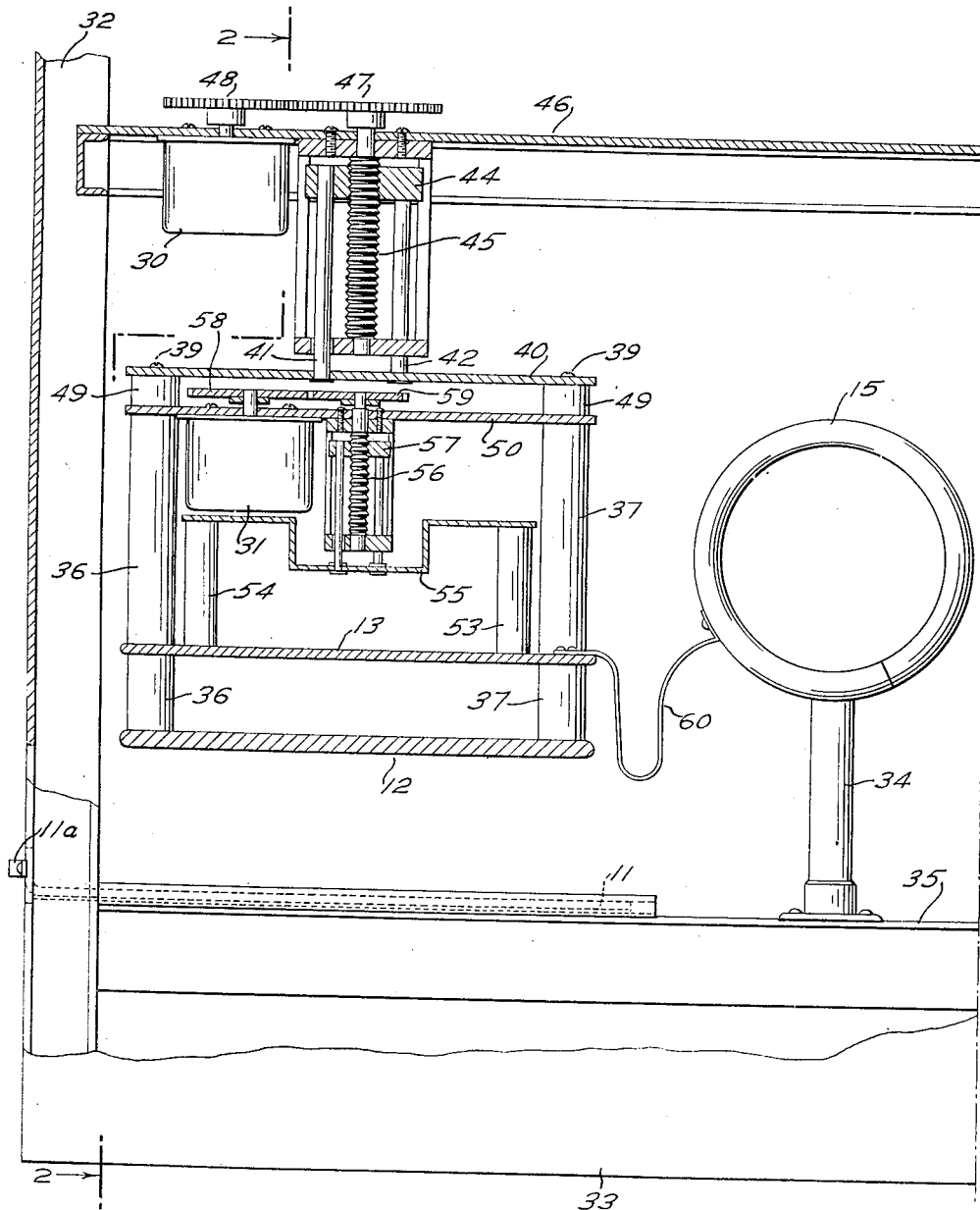
Fig. 1 is a sectional view, of an apparatus embodying the invention, taken on the line I—I of Fig. 2 with parts added.

Referring to the schematic wiring diagram of Fig. 3, there is illustrated the load or material 10 to be treated as disposed between a lower electrode 11 and an upper electrode 12. A third electrode 13 is connected to a conductor 14 leading to an output coil or inductor 15, which through a blocking capacitor 16 is connected to the anode of the electric valve 17. The anode of the valve 17 is connected through a choke coil 18 to the positive side of a source of anode voltage; the negative side thereof being connected by way of a plate-current meter 19 to ground and by a conductor 20 to the mid-point of the secondary winding of a filament transformer 21, the primary winding of which is connected to a suitable source of alternating-current supply. The grid of the valve 17 is connected, by a grid coil 22 through a grid-leak resistor 23 and a grid-leak capacitor 24, to the conductor 20 leading to the cathode. The meter 19 is not included in the grid circuit since the conductor 20 is connected above the grounded side of meter 19. The circuit may be driven or excited by voltage applied by way of the anode-grid capacitance, as indicated by the capacitor 26 shown by the dotted lines, or the grid circuit may be driven by inductive coupling with the output or anode inductor 15. The circuit parameters are selected so that the capacitance between the electrodes 11 and 12, and between the electrodes 12 and 13, will, with the inductance of the inductor 15, be resonant at a desired operating frequency which will ordinarily lie in the range of from 1 to 30 or more megacycles. Since the grid circuit is energized from the anode or output circuit, which includes the load or the dielectric material 10, it will be understood that the frequency of the energy supplied to the grid circuit will vary in accordance with any change in the capacitance between the two sets of electrodes. A change in the capacitance of the tank or output circuit produces a change in the resonant frequency thereof, but the grid circuit while changed somewhat, only produces slight changes in the available power in the normal range of operation because of a change in frequency. However, the power supplied by the oscillator will be largely dependent upon the voltage applied to the load 10, and this voltage will vary with the spacing of the several electrodes.

In accordance with the present invention, a motor 30, under manual or automatic control, is energized to move the electrode 12 into engagement with the work or material 10. A second motor 31, suitably connected to the electrode 13, will, under manual or automatic control, be energized to produce the desired spacing between the electrodes 12 and 13; that is, a spacing which will apply across the load 10 a voltage of desired magnitude. Since there are effectively present in the output circuit two capacitors, 11—12 and 12—13, in series, the voltage across them will divide inversely as their respective capacitances. Accordingly, as the electrode 13 is lowered to decrease the spacing with respect to the electrode 12 and to increase the capacitance, the voltage between the electrodes 11 and 12 will be correspondingly increased. Conversely, opposite movement of the electrode 13 to decrease the capacitance between it and electrode 12 will produce a decrease in the voltage applied to the load or material disposed between electrodes 11 and 12. Accordingly, any desired percentage of the output voltage of the oscillator or high-frequency generator, including the electric valve 17, may be applied to the material 10.

In the preferred form of my invention, the lower electrode 11, Fig. 1, preferably comprises a slidable tray having a handle 11a by means of which it may be withdrawn or inserted in a cabinet fractionally illustrated as at 32 and 33. The cabinet is arranged to house the circuit components partly illustrated in Fig. 3 and which include the output coil or inductor 15 which, it will be observed, is mounted on insulators 34 secured to a shelf or dividing wall 35. One end of the coil 15 is connected to ground, i. e. to the wall 35. The electrode 12 is carried by four insulators, two of which, the insulators 36 and 37, are shown in Fig. 1, and a third of which, the insulator 36a, is shown in Fig. 2. The upper ends of these insulators form with screws 39, spacers 49 and top plate 40, a clamp for an intermediate plate 50. The plate 40 is suspended from three rods 41, 42, and 43, which in turn are carried by a yoke 44 which threadedly engages a feed screw 45. The feed screw 45 extends through an upper plate 46 of the housing and is driven through gears 47 and 48 by the motor 30.

In order that the upper electrode or capacitor plate 13 may be independently adjustable, it will be observed, Fig. 2, that the respective corners thereof are cut away as indicated at 51 to provide clearance around the supporting insulators 36 and 36a. The electrode 13 is itself supported by means of four insulators two of which, the insulators 54 and 54a, are shown in Fig. 2, and a third, the insulator 53, being shown in Fig. 1. These insulators at their upper ends are secured to a plate 55 supported by an adjusting mechanism which includes a threaded member 56 and a threaded yoke 57 of construction identical with the one described for the adjustment of the electrode 12. The lower ends of the insulators are secured to the electrode 13 by countersunk screws (not shown) in the same manner as for the insulators associated with the electrode-plate 12. The plate 55 and the electrode 13 are moved upwardly or downwardly with respect to electrode 12 by suitable manual or automatic energization of the motor 31 which, through the gears 58 and 59, drives the threaded member 56. One end of a flexible conductor 60 is fastened to a selected position on the inductor 15 and the other end is secured to the movable electrode 13, as by screws.

In operation, the load 10 comprising material to be treated or raised in temperature is placed upon the tray-electrode 11 and is moved into the cabinet so as to be substantially centered beneath the electrode 12. This material may comprise plastic preforms or material whose shape is to be altered after the generation of heat therein and under the influence of applied pressure. With the material in place, the motor 30 is energized in a direction in unison to lower the assembly which includes the electrode 12, the motor 31, and its associated sub-assembly including the upper electrode 13. When the electrode 12 engages the work, the motor 30 will be deenergized either manually or automatically by operation of suitable means, as a limit switch, not shown.

When the electrode 12 engages the work, the capacitor plate or electrode 13 preferably will be spaced a substantial distance from electrode 12 for application of a relatively low voltage to the work disposed between electrodes 11 and 12. Before the high-frequency generator is energized downward pressure may be applied to the load by electrode 12. This pressure may be due to the weight of the sub-assembly, the actuating rods 41—43 being effective to lift the sub-assembly and to be lowered so that the enlarged ends are free of plate 40. In consequence, the weight of the sub-assembly is applied to the load. The downward pressure may be increased by adding weight to the plate 40 or by using a weight suspended from a lever arranged to press downwardly on the plate 40. The applied pressure serves to smooth out irregularities in the surface of the work which might otherwise cause arcing under normal operation by reason of small air gaps between the work and the electrode 12. The applied pressure not only flattens out irregularities and minimizes arcing but it also minimizes swelling and distortion of the work during the heating operation.

With the material to be heated under pressure of desired magnitude, and the electrode 13 in a position of desired minimum capacity, corresponding with a reduced voltage applied to the material to be heated, the oscillator, including the valve 17, will be energized to apply high-frequency energy to the load. The motor 31 will then be energized in a direction to increase the capacitance between electrodes 12 and 13 and to raise the voltage applied to the load. When the output current reaches a predetermined value, such, for example, as may be indicated by a distinctively colored area 19a on the face of the meter 19, the progressive increase in the voltage and capacitance may be terminated.

As soon as the desired heating or treating time has elapsed, the oscillator or valve 17 will be deenergized and the motor 30 energized to raise in unison the electrode 12 and associated assembly, including electrode 13, out of engagement with the material which has been heated. The motor 31 may also be energized to raise the capacitor plate 13 a predetermined amount preparatory to the next heating operation. The drawer-electrode 11 may then be withdrawn from the cabinet together with the load or charge carried thereby.

During the heating operation, the motor 31 may be energized to vary the capacitance between electrodes 13 and 12 and so control the rate of heating of the load. This control may be automatic in response to magnitude of the plate current of the high-frequency generator, and may comprise a system of the type disclosed and claimed in my co-pending application, Serial No. 597,048, filed June 1, 1945, and entitled "High-frequency treating system." Or, the strap or flexible conductor 60 may be secured to the electrode 12 and the motor 30 automatically controlled in the same manner as described in my aforesaid application, specifically with a variable air space between the work and the electrode 12.

While a preferred embodiment of my invention has been described, it is to be understood that further modifications of the invention may be made without departing from the scope of the appended claims.

What is claimed is:

1. A high-frequency heating system comprising a high-frequency generator having an output circuit, two variable capacitors in series with each other in said output circuit and comprising three spaced, parallel, plate-like electrodes, means carried by a second of said electrodes for supporting a first of said electrodes, means for moving the first and second of said electrodes in unison to vary their parallel spacing with respect to the third of said electrodes to accommodate dielectric objects to be heated between said second and third electrodes and without variation of the capacity between said first and second electrodes, and means for moving the first of said electrodes relative to said second electrode to vary the capacity between said first and second electrodes so to vary the radio-frequency voltage applied to said objects and without variation of the spacing between said second and third electrodes.

2. A high-frequency heating apparatus comprising a work tray forming one electrode, two movable parallel electrodes spaced one above the other over said tray, adjustable supporting structure carried by one movable electrode for adjustably supporting the other movable electrode, means for raising and lowering said two electrodes in unison, means for operating said structure independently to raise and lower the upper of said two electrodes, a high-frequency generator having an output circuit, and means connecting said circuit to said work tray and to the upper of said two electrodes.

3. A dielectric heating apparatus comprising three electrodes arranged in face-to-face relation to provide two electric capacitors in series-circuit relationship, one of the outside ones of said electrodes being stationary, the intermediate one of said electrodes and said stationary electrode being arranged to receive therebetween dielectric material to be heated by an electric field, a source of high-frequency electrical energy, means connecting said source and said capacitors in series including connections to said stationary electrode and to the other of said outside electrodes, and adjustable supporting structure operable to vary the positions of said last-mentioned outside electrode and of said intermediate electrode relative to each other and to said stationary electrode, thereby to vary the capacitances between said intermediate electrode and said outside electrodes.

4. A dielectric heater comprising a first plate-like electrode, a second plate-like electrode parallel to and forming a capacitor with said first electrode, a supporting member for said second electrode, insulators secured to and extending between said member and said second electrode, driving means connected to said member for moving said second electrode relative to said first electrode along a path generally normal to the plane thereof, a third parallel plate-like electrode forming a capacitor with said second electrode and having openings through which said insulators extend, insulated driving means for moving said third electrode toward and away from said second electrode along a path generally normal to the plane thereof, and means for connecting between said third electrode and said first electrode a source of high-frequency electrical energy with said capacitors in series therewith.

5. In a dielectric heater the combination of a first plate-like electrode, a second plate-like electrode spaced therefrom for disposition therebetween of material to be heated, adjustable means for bodily moving said second electrode toward and away from said first electrode along a path normal to the plane thereof and comprising a supporting member movable with said second electrode, elongated insulators connected between said member and said second electrode and a motor-driven positioning means connected to said supporting member, a second adjustable means supported from said member, a third plate-like electrode, means including insulators connected to said third electrode and movable by said second adjustable means to vary the position of said third electrode relative to said second electrode, and means for connecting said first electrode and said third electrode to a source of high-frequency electrical energy to provide a pair of capacitors in series therewith.

6. The combination set forth in claim 5, in which said electrodes are of substantially the same area except that the corner portions of said third electrode are cut away to make room for the insulators of said first adjustable means.

7. In a dielectric heating apparatus, the combination of a first plate-like electrode, a unitary structure movable relative thereto and including a second plate-like electrode and means supporting said second electrode in parallel insulated capacitive relation with said first electrode, said first and second electrodes being arranged to receive therebetween dielectric material to be heated by an electric field, means for moving said unitary structure to vary the parallel spacing of said second electrode relative to said first electrode, a third plate-like electrode carried by said movable unitary structure in parallel insulated capacitive relation with said second electrode, a source of high-frequency electrical energy, means connecting said source to said first and third electrodes to provide two capacitors in series with said source, said third electrode being movable to vary the capacitance between said second and third electrodes, and means for moving said third electrode relative to said second electrode independently of relative movement between said second and first electrodes.

8. In a dielectric heating apparatus, the combination of a first plate-like electrode, a unitary structure movable relative thereto and including a second plate-like electrode and means supporting said second electrode in parallel insulated capacitive relation with said first electrode, said first and second electrodes being arranged to receive therebetween dielectric material to be heated by an electric field, driving means for moving said unitary structure to vary the parallel spacing of said second electrode relative to said first electrode, a third plate-like electrode carried by said movable unitary structure in parallel insulated capacitive relation with said second electrode, a source of high-frequency electrical energy, means connecting said source to said first and third electrodes to provide two capacitors in series with said source, said third electrode being movable to vary the capacitance between said second and third electrodes, and driving means carried by said movable unitary structure and operable to effect movement of said third electrode relative to said second electrode independently of relative movement between said second and first electrodes.

9. A dielectric heating apparatus comprising a first plate-like electrode and a second plate-like electrode disposed in capacitive relationship and arranged to receive therebetween dielectric material to be heated by an electric field, means operable to effect relative movement between said electrodes and to control the application of pressure on material disposed therebetween, a source of high-frequency electrical energy connected to said first electrode, a third plate-like electrode connected to said source of energy and disposed in capacitive relationship with said second electrode on the opposite side of the latter from said first electrode to form two capacitors in series with said source, and means operable to effect movement of said third electrode relative to said second electrode independently of relative movement between said first and second electrodes, thereby to vary the capacitance between said second and third electrodes.

10. A high-frequency dielectric heating apparatus comprising a first plate-like electrode, a unitary structure movable relative thereto and including a second plate-like electrode and means supporting the latter in parallel insulated capacitive relation with said first electrode, said first and second electrodes being arranged to receive therebetween dielectric material to be heated by an electric field, driving means for moving said unitary structure to vary the spacing of said second electrode relative to said first electrode and after engagement of said second electrode with said dielectric material for controlling the application by said unitary structure of a substantial positive pressure on said material engaged by said first and second electrodes, a sub-assembly wholly supported by said movable unitary structure and including a third plate-like electrode supported in parallel insulated capacitive relation with said second electrode on the opposite side of the latter from said first electrode, said sub-assembly including driving means for varying the spacing of said third electrode relative to said second electrode so as to vary the capacitance between the second and third electrodes independently of variation of the spacing between said first and second electrodes, and a source of high-frequency electrical energy connected to said first and said third electrodes the two capacitors between said electrodes being in series with said source.

11. A high-frequency dielectric heating apparatus comprising a first plate-like electrode, a source of high-frequency electrical energy connected therewith, a unitary structure movable relative to said electrode and including a second plate-like electrode arranged in capacitive relation with said first electrode for accommodation of dielectric material to be heated by an electric field between said first and second electrodes, said movable unitary structure also including a supporting member and compression insulators rigidly joining said second electrode to said member, motor-driven means for moving said unitary structure relative to said first electrode and after engagement of said second electrode with said material for controlling the application by said unitary structure of a substantial positive pressure on said material engaged by said first and second electrodes, and a sub-assembly wholly supported by said movable unitary structure and including a third plate-like electrode supported in insulated capacitive relation with said second electrode, said third electrode being disposed between said second electrode and its said supporting member and being connected with said source of electrical energy, said sub-asssembly also including motor-driven means operable to vary the spacing of said third electrode relative to said second electrode so as to vary the capacitance between said second and third electrodes independently of variation in the capacitance due to positioning of said second electrode relative to said first electrode.

WILFRID L. ATWOOD.

REFERENCES CITED

The following references are of record in the file of this patent:

UNITED STATES PATENTS

| Number | Name | Date |
|---|---|---|
| 1,877,918 | Little | Sept. 20, 1932 |
| 2,436,732 | Rowe | Feb. 24, 1948 |

FOREIGN PATENTS

| Number | Country | Date |
|---|---|---|
| 556,292 | Great Britain | Sept. 28, 1943 |

OTHER REFERENCES

Electronics, vol. 18, No. 2, February 1945, pages 114 and 115.